United States Patent
Lai et al.

(10) Patent No.: US 9,143,820 B2
(45) Date of Patent: Sep. 22, 2015

(54) METHOD FOR PERFORMING FLUENT PLAYBACK CONTROL IN RESPONSE TO DECODING STATUS, AND ASSOCIATED APPARATUS

(75) Inventors: Chun-Ming Lai, Hsinchu (TW); Jian-Liang Lin, Yilan (TW); Fang-Yi Hsieh, Taipei (TW); Wei-Nien Chen, Hsinchu (TW); Kuan-Hung Chou, New Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 100 days.

(21) Appl. No.: 13/429,436

(22) Filed: Mar. 25, 2012

(65) Prior Publication Data
US 2013/0251343 A1   Sep. 26, 2013

(51) Int. Cl.
| | |
|---|---|
| H04N 5/94 | (2006.01) |
| H04N 21/43 | (2011.01) |
| H04N 21/433 | (2011.01) |
| H04N 21/44 | (2011.01) |
| H04N 21/4402 | (2011.01) |

(52) U.S. Cl.
CPC ....... *H04N 21/4307* (2013.01); *H04N 21/4333* (2013.01); *H04N 21/44008* (2013.01); *H04N 21/440281* (2013.01)

(58) Field of Classification Search
None
See application file for complete search history.

(56) References Cited

U.S. PATENT DOCUMENTS

| | | | | |
|---|---|---|---|---|
| 2001/0017978 | A1* | 8/2001 | Nagasawa | 386/111 |
| 2001/0044711 | A1* | 11/2001 | Monda et al. | 704/200.1 |
| 2002/0152083 | A1* | 10/2002 | Dokic et al. | 704/500 |
| 2003/0021587 | A1* | 1/2003 | Sugimoto et al. | 386/95 |
| 2003/0063578 | A1* | 4/2003 | Weaver | 370/289 |
| 2006/0078305 | A1* | 4/2006 | Arora et al. | 386/96 |
| 2008/0259962 | A1* | 10/2008 | Mori et al. | 370/498 |

\* cited by examiner

*Primary Examiner* — Thai Tran
*Assistant Examiner* — Sunghyoun Park
(74) *Attorney, Agent, or Firm* — Winston Hsu; Scott Margo

(57) ABSTRACT

A method for performing fluent playback control is provided, where the method is applied to an electronic device. The method includes the steps of: determining whether an out of synchronization status regarding audio playback and video playback occurs; and when it is detected that the out of synchronization status occurs, controlling jump timing of video playback according to at least one of scene change detection and standstill detection. For example, the scene change detection can be performed to determine whether a scene change exists, and when it is detected that the scene change exists, a jump operation of video playback is triggered. In another example, the standstill detection can be performed to determine whether a standstill phenomenon exists, in order to determine whether to delay triggering a jump operation of video playback. In another example, a temporary audio pause operation can be selectively performed. An associated apparatus is also provided.

16 Claims, 12 Drawing Sheets

METHOD FOR PERFORMING FLUENT PLAYBACK CONTROL IN RESPONSE TO DECODING STATUS, AND ASSOCIATED APPARATUS

BACKGROUND

The present invention relates to audio/video (A/V) playback control of an electronic device, and more particularly, to a method for performing fluent playback control, and to an associated apparatus.

According to the related art, a portable electronic device equipped with a touch screen (e.g., a multifunctional mobile phone, a personal digital assistant (PDA), a tablet, etc) can be utilized for playback of an A/V clip or an A/V program. In a situation where the A/V clip or the A/V program comprises a lot of encoded data to be decoded, some problems may occur. For example, because of the codec complexity, fluent playback at each moment may not be guaranteed, where this problem may occasionally occur when some parameters of the A/V clip or the A/V program (such as the resolution, media type, etc.) are beyond the supported specifications. In another example, the video playback may be delayed due to decoding capability deficiency of the portable electronic device (e.g. in a situation where the system is busy handling multiple tasks at the same time) since the decoding load of the video portion in the A/V clip or the A/V program is typically heavier than that of the audio portion in the A/V clip or the A/V program. It seems unlikely that some conventional methods can solve the aforementioned problems without introducing some side effects, where examples of the side effects mentioned above may comprise standstill and audio-distortion problems. The standstill problem typically means the time that a future image is decoded and displayed on the screen is too late and therefore this current displaying image stays for a longer period than the predefined one on the screen. The audio-distortion problem typically means the audio playback is distorted due to adjustment of the audio playback. In conclusion, the related art does not serve the end user well. Thus, a novel method is required for enhancing playback control of an electronic device.

SUMMARY

It is therefore an objective of the claimed invention to provide a method for performing fluent playback control, and to provide an associated apparatus, in order to solve the above-mentioned problems.

It is another objective of the claimed invention to provide a method for performing fluent playback control, and to provide an associated apparatus, in order to maintain audio playback/video playback synchronization without introducing any side effect.

It is another objective of the claimed invention to provide a method for performing fluent playback control, and to provide an associated apparatus, in order to insensibly adjust the audio playback speed and/or the video playback speed.

An exemplary embodiment of a method for performing fluent playback control is provided, where the method is applied to an electronic device. The method comprises the steps of: determining whether an out of synchronization status regarding audio playback and video playback occurs; and when it is detected that the out of synchronization status occurs, controlling jump timing of video playback according to at least one of scene change detection and standstill detection. For example, the step of controlling the jump timing of video playback according to at least one of the scene change detection and the standstill detection may further comprise: performing the scene change detection to determine whether a scene change exists; and when it is detected that the scene change exists, triggering a jump operation of video playback. In another example, the step of controlling the jump timing of video playback according to at least one of the scene change detection and the standstill detection may further comprise: performing the standstill detection to determine whether a standstill phenomenon exists, in order to determine whether to delay triggering a jump operation of video playback.

An exemplary embodiment of an apparatus for performing fluent playback control is provided, where the apparatus comprises at least one portion of an electronic device. The apparatus comprises a clock and a processing circuit. The clock is arranged to provide a time reference. In addition, the processing circuit is arranged to control operations of the electronic device and determine whether an out of synchronization status regarding audio playback and video playback occurs, wherein the time reference is utilized for determine whether the out of synchronization status occurs. Additionally, when it is detected that the out of synchronization status occurs, the processing circuit controls jump timing of video playback according to at least one of scene change detection and standstill detection. For example, the processing circuit may perform the scene change detection to determine whether a scene change exists, wherein when it is detected that the scene change exists, the processing circuit triggers a jump operation of video playback. In another example, the processing circuit may perform the standstill detection to determine whether a standstill phenomenon exists, in order to determine whether to delay triggering a jump operation of video playback.

An exemplary embodiment of a method for performing fluent playback control is provided, where the method is applied to an electronic device. The method comprises the steps of: detecting whether candidate audio samples exist; and when it is detected that candidate audio samples exist, performing a temporary audio pause operation, in order to control timing of video playback and audio playback to be synchronized.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
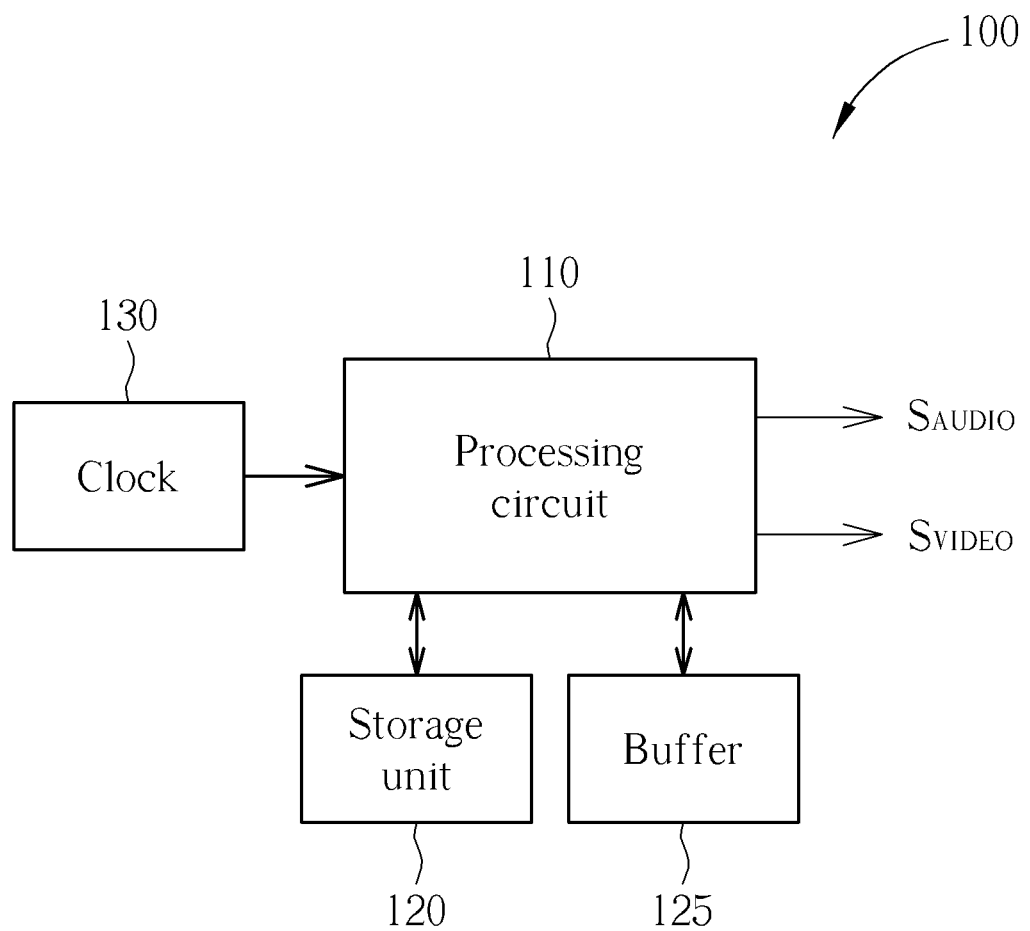
FIG. 1 is a diagram of an apparatus for performing fluent playback control according to a first embodiment of the present invention.

Please refer to FIG. 1, which illustrates a diagram of an apparatus 100 for performing fluent playback control according to a first embodiment of the present invention. According to different embodiments, such as the first embodiment and some variations thereof, the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a tablet personal computer (which can also be referred to as the tablet, for simplicity), a laptop computer, or desktop computer.

As shown in FIG. 1, the apparatus 100 comprises a processing circuit 110, a storage unit 120, a buffer 125, and a clock 130. The storage unit 120 is arranged to temporarily store information, such as information of an audio/video (A/V) clip or an A/V program, and the buffer 125 is arranged to buffer information for the processing circuit 110. For example, the storage unit 120 can be a hard disk drive (HDD) or a non-volatile memory such as a Flash memory), and the buffer 125 can be a volatile memory such as a random access memory (RAM). In addition, the clock 130 is arranged to provide a time reference. For example, the clock 130 can be equipped with an oscillator whose oscillation frequency is equivalent to 32 kilohertz (kHz). In another example, the clock 130 can be equipped with an oscillator whose oscillation frequency is equivalent to 26 megahertz (MHz). Additionally, the processing circuit 110 is arranged to control operations of the electronic device, and more particularly, to retrieve multimedia such as the A/V clip or the A/V program, to perform A/V decoding control and A/V playback control regarding the multimedia such as the A/V clip or the A/V program, and to perform some associated detection operations according to the time reference, in order to decode and play back the A/V clip or the A/V program. During decoding the A/V clip or the A/V program, some partially or fully decoded contents/data of the A/V clip or the A/V program can be buffered in the buffer 125, and base upon the clock 130, the processing circuit 110 can output the decoded audio contents/data and the decoded video contents/data through the output signals $S_{AUDIO}$ and $S_{VIDEO}$ at their right time, respectively, for being synchronously played back by using at least one audio output module (e.g. one or more speakers, or one or more earphones) and at least one display module (e.g. a liquid crystal display (LCD) module, a touch screen, an LCD monitor, and/or a projector), respectively. As a result, the A/V clip or the A/V program can be played back without introducing any related art problem (e.g. the non-fluent playback problem or the video playback delay problem), having no side effect (e.g. the standstill problem or the audio-distortion problem) being introduced. Please refer to FIG. 2. Some implementation details are described in the following.

Figure 2:
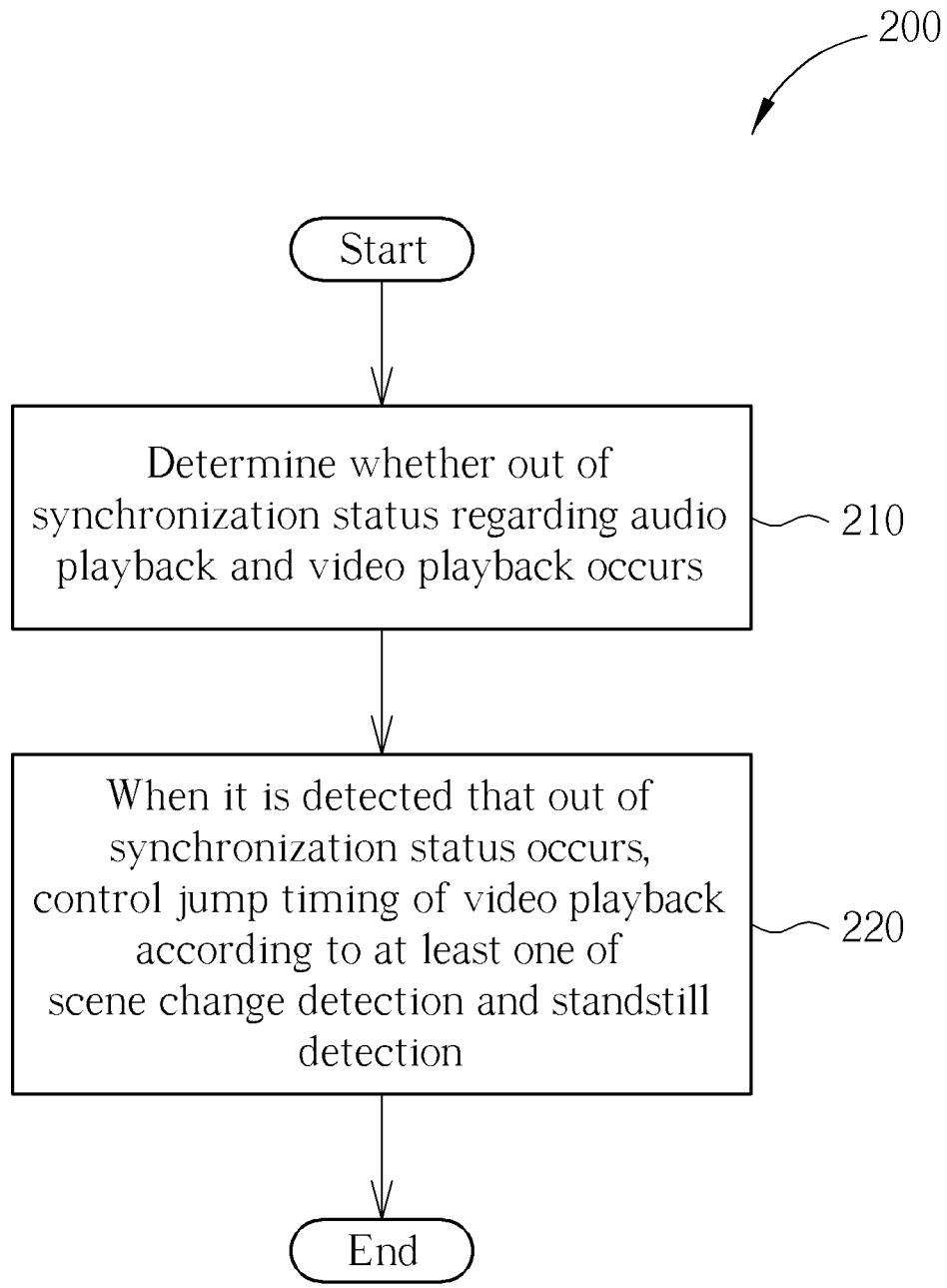
FIG. 2 illustrates a flowchart of a method for performing fluent playback control according to an embodiment of the present invention.

FIG. 2 illustrates a flowchart of a method 200 for performing fluent playback control according to an embodiment of the present invention. The method shown in FIG. 2 can be applied to the apparatus 100 shown in FIG. 1. The method is described as follows.

In Step 210, the processing circuit 110 determines whether an out of synchronization status regarding audio playback and video playback occurs, where the time reference is utilized for determining whether the out of synchronization status occurs. More particularly, the processing circuit 110 can determine whether the out of synchronization status occurs by comparing time stamps of decoded audio and video data to be played back with the time reference, respectively. For example, in a situation where there is no difference between the time stamp of the latest decoded audio data to be played back and the time reference, when a difference between the time stamp of the latest decoded video data to be played back and the time reference reaches a predetermined threshold value, the processing circuit 110 can determine that the out of synchronization status occurs.

In Step 220, when it is detected that the out of synchronization status occurs, the processing circuit 110 controls jump timing of video playback according to at least one of scene change detection and standstill detection (e.g. the scene change detection and/or the standstill detection). Typically, the jump timing means the timing of a jump operation of video playback, and more particularly, the timing of jumping to a selected frame to be played back (e.g. a key frame, for better performance) and starting playing this selected frame. For example, when it is detected that the out of synchronization status occurs, the processing circuit 110 can control the jump timing of video playback according to only one of the scene change detection and the standstill detection. In another example, when it is detected that the out of synchronization status occurs, the processing circuit 110 can control the jump timing of video playback according to both of the scene change detection and the standstill detection.

According to some embodiments, such as the embodiment shown in FIG. 2 and some variations thereof, the processing circuit 110 can perform the scene change detection to determine whether a scene change exists. When it is detected that the scene change exists (e.g. it is detected that the scene change corresponds to a certain frame within the buffered decoded video data to be played back, or it is detected that the scene change exists in the decoded video data to be played back, where both examples are based upon the current decoding status), the processing circuit 110 triggers the jump operation of video playback, and more particularly, triggers the jump operation of video playback to jump to a target frame. As a result of performing the timing control of the jump operation, the probability that the user is sensible of the jump operation may reach zero. Thus, the present invention method and apparatus allow the user to enjoy viewing the A/V clip or the A/V program, without encountering any related art problem, where no side effect will be introduced.

According to some embodiments, such as the embodiment shown in FIG. 2 and some variations thereof, the processing circuit 110 can perform the standstill detection to determine whether a standstill phenomenon exists, in order to determine whether to delay triggering the jump operation of video playback, where the term "standstill phenomenon" may represent that the standstill problem may occur based upon the current decoding status, and therefore, determining whether the standstill phenomenon exists is not limited to be determining whether the standstill problem mentioned above exists. For example, when it is detected that the standstill phenomenon exists (e.g. it is detected that the standstill problem occurs, or it is detected that the standstill problem may occur based upon the current decoding status and should be prevented), the processing circuit 110 delays triggering the jump operation of video playback. In another example, when it is detected that the standstill phenomenon does not exist (e.g. it is detected that no standstill problem occurs, or it is detected that no standstill problem may occur based upon the current decoding status), the processing circuit 110 triggers the jump operation of video playback. In practice, the processing circuit 110 can perform the standstill detection by analyzing time stamps of decoded audio and video data to be played back. As a result of performing the timing control of the jump operation, the probability that the user is sensible of the jump operation may reach zero. Thus, the present invention method and apparatus allow the user to enjoy viewing the A/V clip or the A/V program, without encountering any related art problem, where no side effect will be introduced.

According to some embodiments, no matter whether the jump timing of video playback is controlled by the processing circuit 110 according to the scene change detection and/or the standstill detection (e.g. according to the scene change detection only, or according to the standstill detection only, or according to both of the scene change detection and the standstill detection), the processing circuit 110 can alter at least one time stamp of decoded audio and video data to be played back, in order to control timing of video playback and audio playback to be synchronized. According to some embodiments, no matter whether the jump timing of video playback is controlled by the processing circuit 110 according to the scene change detection and/or the standstill detection (e.g. according to the scene change detection only, or according to the standstill detection only, or according to both of the scene change detection and the standstill detection), the processing circuit 110 can detect whether candidate audio samples exist (e.g. a plurality of continuous audio samples whose magnitude is less than a predetermined threshold). When it is detected that the candidate audio samples exist, the processing circuit 110 performs a temporary audio pause operation, in order to control timing of video playback and audio playback to be synchronized. For example, the temporary audio pause operation can be performed between the playback of a first portion of the candidate audio samples and the playback of a second portion of the candidate audio samples. In another example, the temporary audio pause operation can be performed after the playback of the candidate audio samples. In another example, the temporary audio pause operation can be performed before the playback of the candidate audio samples. In practice, the temporary audio pause operation can be carried out by inserting one or more dummy audio samples whose magnitude is less than the predetermined threshold (e.g. one or more dummy audio samples having zero magnitude) between two audio samples in an audio playback sequence comprising the candidate audio samples.

Figure 3:
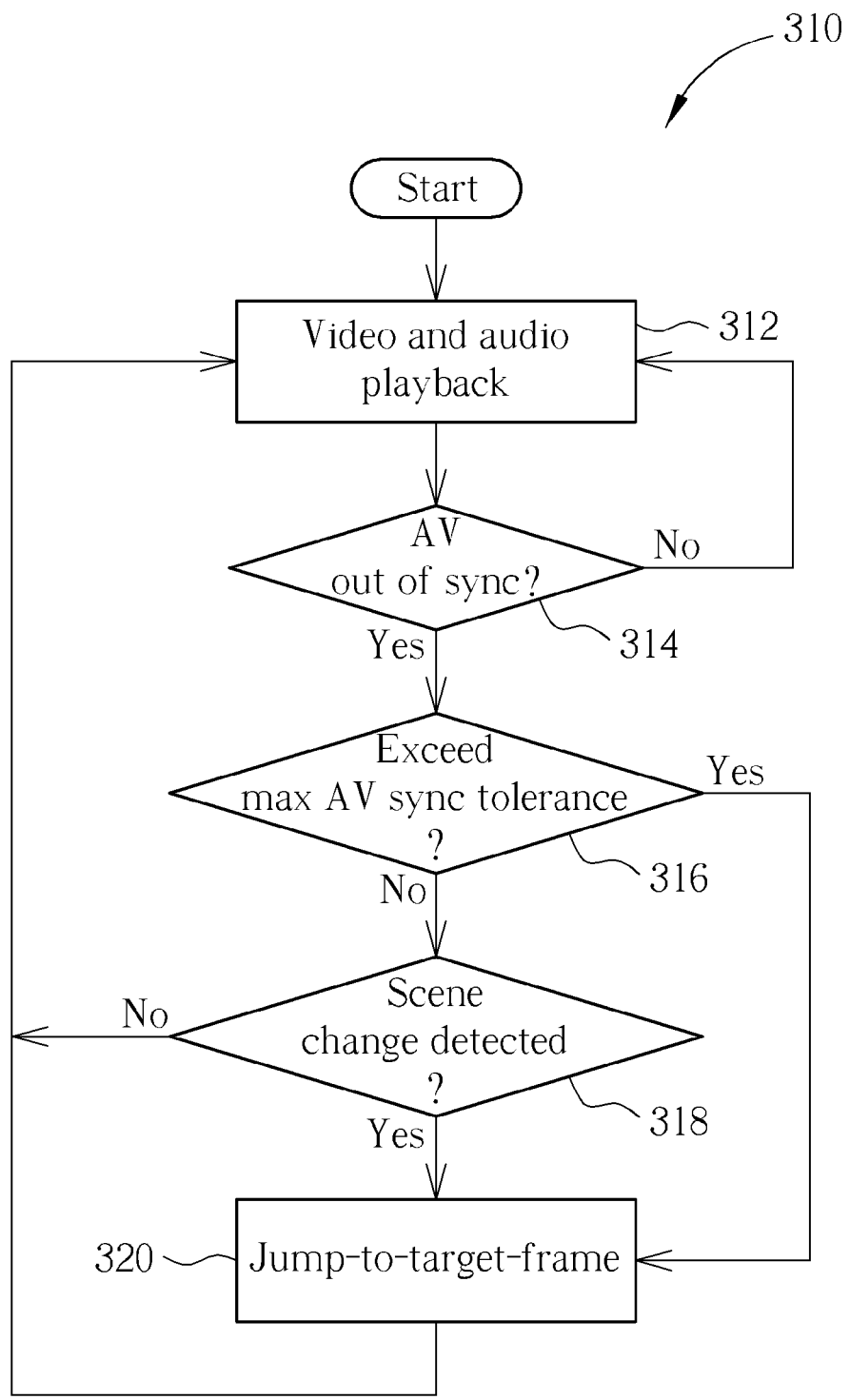
FIG. 3 illustrates a working flow involved with the method shown in FIG. 2 according to an embodiment of the present invention.

FIG. 3 illustrates a working flow 310 involved with the method 200 shown in FIG. 2 according to an embodiment of the present invention.

In Step 312, the processing circuit 110 performs video and audio playback. Typically, the processing circuit 110 performs video playback and audio playback at the same time.

In Step 314, the processing circuit 110 determines whether the aforementioned out of synchronization status regarding audio playback and video playback (labeled "AV out of sync" in FIG. 3) occurs. When it is detected that the out of synchronization status occurs, Step 316 is entered; otherwise, Step 312 is re-entered.

In Step 316, the processing circuit 110 determines whether an out of synchronization index of the aforementioned out of synchronization status exceeds the maximum allowable out of synchronization value (labeled "Exceed max AV sync tolerance" in FIG. 3), where an example of the out of synchronization index can be a difference regarding time stamp(s). For example, in a situation where there is no difference between the time stamp of the latest decoded audio data to be played back and the time reference mentioned above, the out of synchronization index can be the difference between the time stamp of the latest decoded video data to be played back and the time reference. When the out of synchronization index reaches a predetermined threshold value such as that mentioned above (e.g. the maximum allowable out of synchronization value of this embodiment), the processing circuit 110 can determine that the out of synchronization index exceeds the maximum allowable out of synchronization value, which means the out of synchronization status of this moment is not acceptable and something should be performed to achieve better playback performance. When it is detected that the out of synchronization index exceeds the maximum allowable out of synchronization value, Step 320 is entered; otherwise, Step 318 is entered.

In Step 318, the processing circuit 110 determines whether a scene change such as that mentioned above exists. When it is detected that the scene change exists (labeled "scene change detected" in FIG. 3), Step 320 is entered; otherwise, Step 312 is re-entered.

In Step 320, the processing circuit 110 triggers a jump operation (labeled "Jump-to-target-frame" in FIG. 3) such as that mentioned above, in order to jump to a target frame such as that mentioned above (e.g. a key frame).

As disclosed in FIG. 3, Step 316 is arranged between Step 314 and Step 318 within the working flow 310, where the arrangement of Step 316 can prevent Step 320 from being blocked by Step 318 in some situations (e.g., in a situation where no scene change is detected for a long time period). This is for illustrative purposes only, and is not meant to be a limitation of the present invention. According to a variation of this embodiment, Step 316 can be omitted, where the original downward arrowhead starting from Step 314 is redirected toward Step 318. Similar descriptions for this variation are not repeated in detail here.

Figure 4:
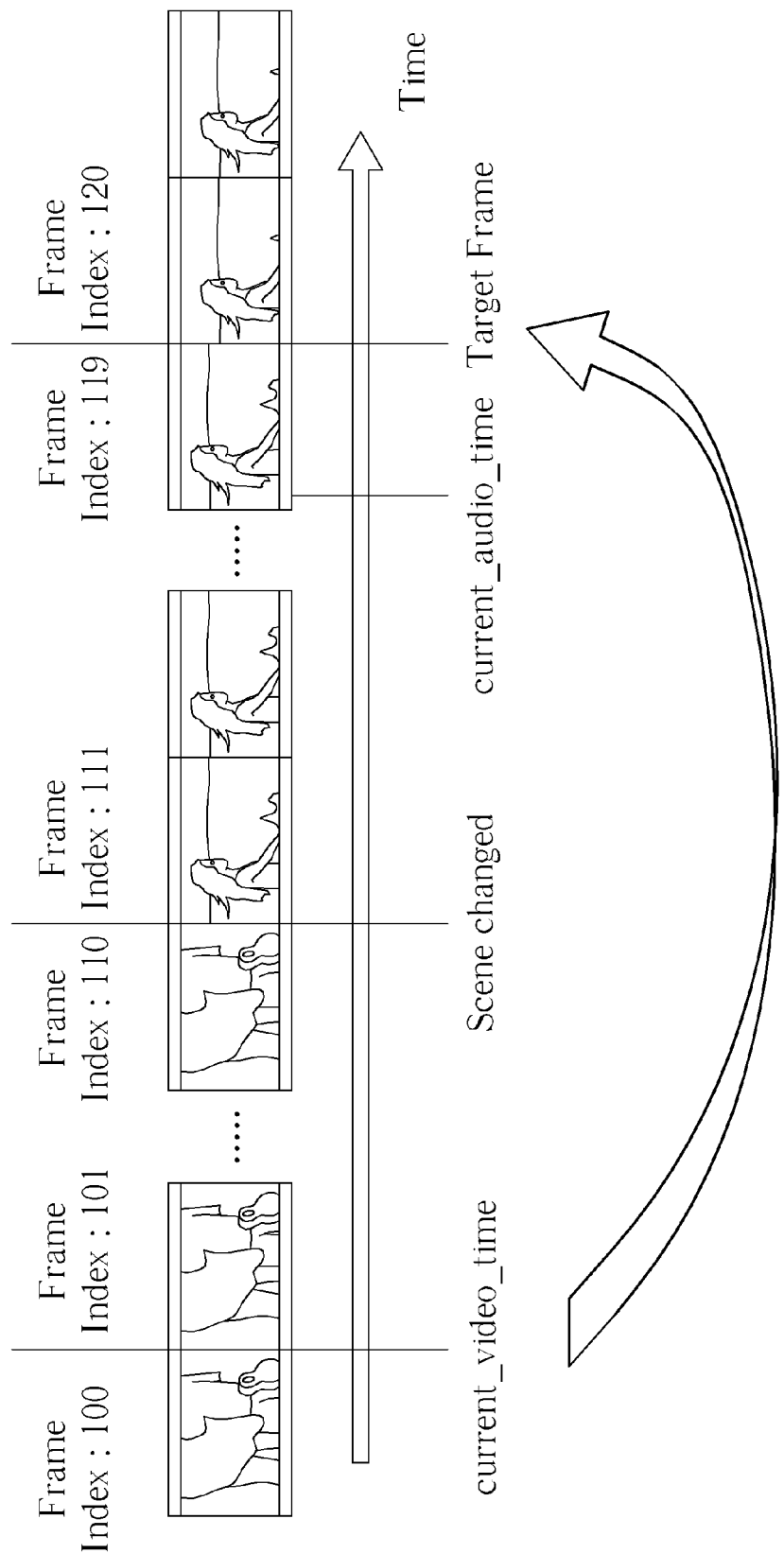
FIG. 4 illustrates an exemplary timing control scheme involved with the method shown in FIG. 2 according to the embodiment shown in FIG. 3.

FIG. 4 illustrates an exemplary timing control scheme involved with the method 200 shown in FIG. 2 according to the embodiment shown in FIG. 3, where the aforementioned scene change detection is applied to the apparatus 100. The notation current_video_time represents the time of the time stamp of a frame being played back currently. For example, the frame being played back currently can be the frame having the index 101, and the frame that has just been played back can be the frame having the index 100. In addition, the notation current_audio_time represents the time of the time stamp of the audio content being played back currently. For example, the audio content being played back currently may be the audio content for the frame having the index 119. Suppose that the scene change mentioned in Step 318 is detected to be at the frame having the index 111, i.e., the scene is changed when the A/V clip or the A/V program switches from the frame having the index 110 to the frame having the index 111. In this embodiment, as the frame having the index 120 is the target frame (e.g. the earliest key frame after the time current_audio_time of the time stamp of the audio content being played back currently, the processing circuit 110 selects a frame such as the frame having the index 120 (e.g. an intra frame) as the target frame of the jump operation mentioned in Step 320. Thus, under control of the processing circuit 110, the video playback jumps from the frame having the index 100 to the frame having the index 120, in order to achieve the goal of A/V synchronization (i.e. the aforementioned audio playback/video playback synchronization).

Figure 5:
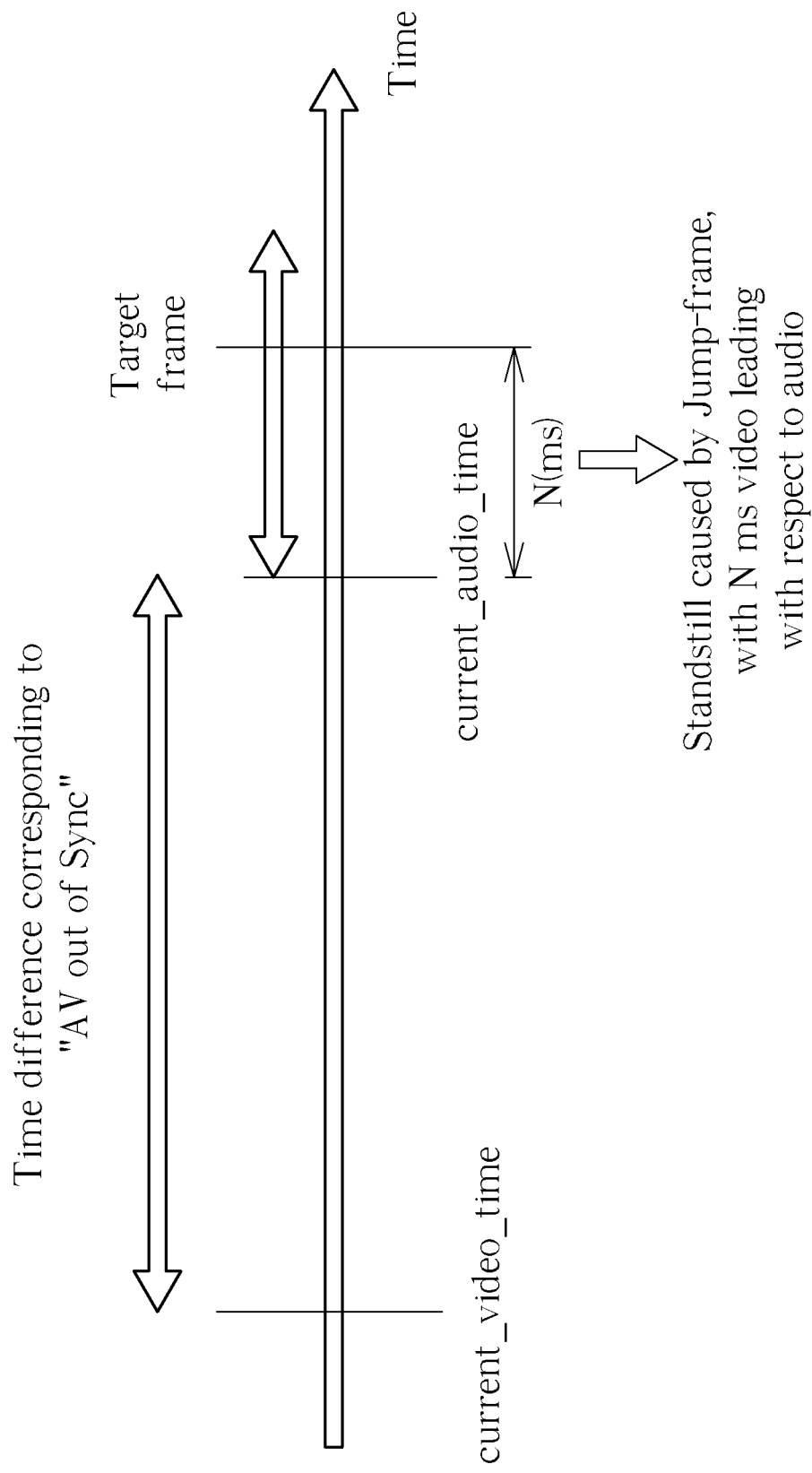
FIG. 5 illustrates an exemplary standstill detection scheme involved with the method shown in FIG. 2 according to another embodiment of the present invention.

FIG. 5 illustrates an exemplary standstill detection scheme involved with the method 200 shown in FIG. 2 according to another embodiment of the present invention. As mentioned, the notation current_video_time represents the time of the time stamp of the frame being played back currently, and the notation current_audio_time represents the time of the time stamp of the audio content being played back currently. Thus, the time difference between the time current_video_time of the time stamp of the frame being played back currently and the time current_audio_time of the time stamp of the audio content being played back currently represents the time difference corresponding to the aforementioned out of synchronization status (labeled "AV out of Sync" in FIG. 5).

Suppose that the time difference between the time of the time stamp of the target frame for jumping and the time current_audio_time of the time stamp of the audio content being played back currently is equivalent to N milliseconds (ms). According to this embodiment, the processing circuit 110 detects the standstill phenomenon mentioned above, and more particularly, the standstill phenomenon caused by the jump operation to be performed, with N ms video leading with respect to audio (labeled "Standstill caused by Jump-frame, with N ms video leading with respect to audio" in FIG. 5). As the processing circuit 110 detects this standstill phenomenon in a situation such as that shown in FIG. 5, the processing circuit 110 predicts that the standstill problem would probably occur due to this standstill phenomenon and performs standstill elimination to prevent the standstill problem. Please refer to FIG. 6. Some implementation regarding the standstill elimination mentioned above can be described in the following.

Figure 6:
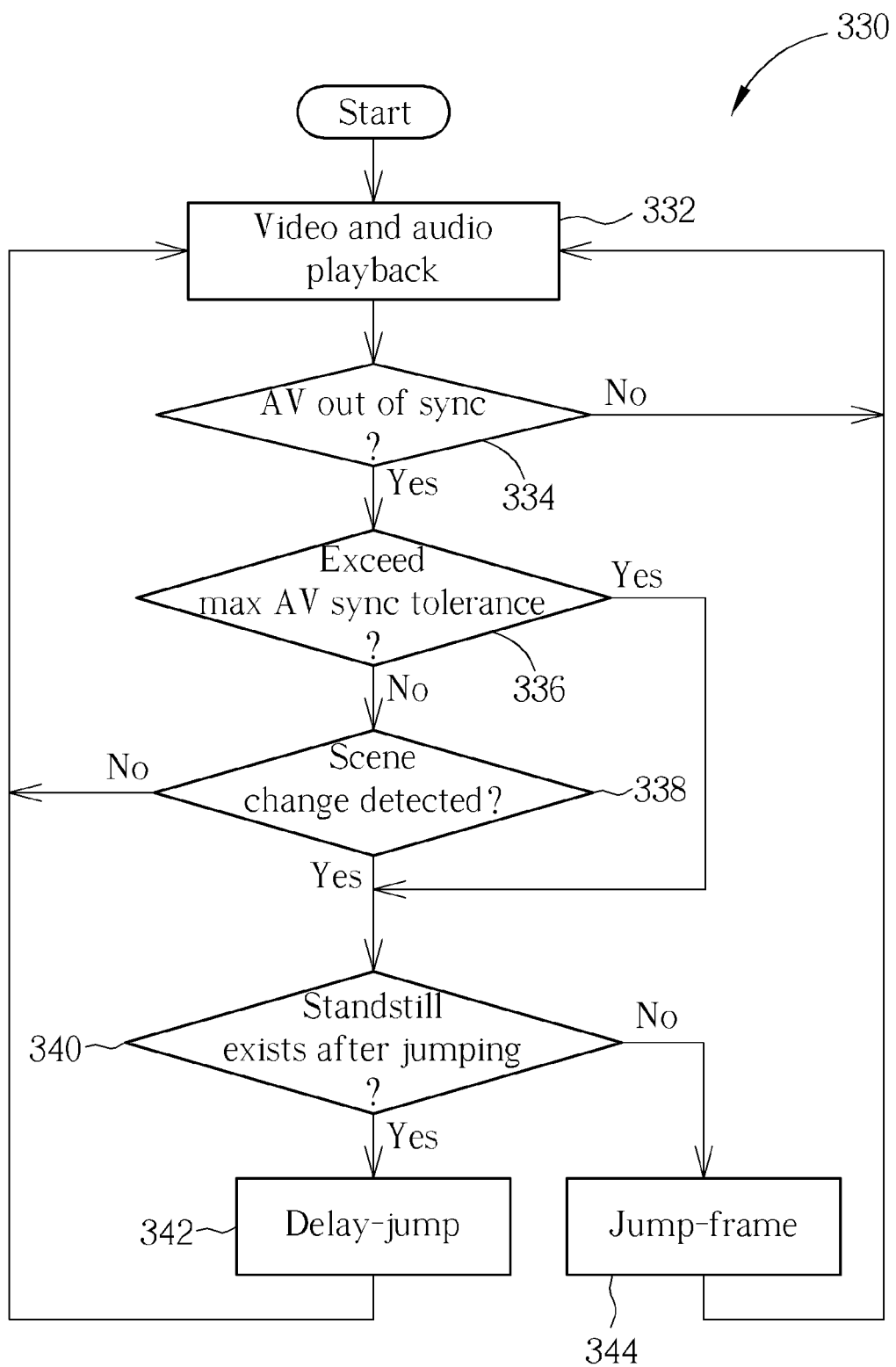
FIG. 6 illustrates a working flow involved with the method shown in FIG. 2 according to an embodiment of the present invention.

FIG. 6 illustrates a working flow 330 involved with the method 200 shown in FIG. 2 according to an embodiment of the present invention, where the standstill problem can be prevented by applying delay to the jump operation mentioned above.

In Step 332, the processing circuit 110 performs video and audio playback. Typically, the processing circuit 110 performs video playback and audio playback at the same time.

In Step 334, the processing circuit 110 determines whether the aforementioned out of synchronization status regarding audio playback and video playback (labeled "AV out of sync" in FIG. 6) occurs. When it is detected that the out of synchronization status occurs, Step 336 is entered; otherwise, Step 332 is re-entered.

In Step 336, the processing circuit 110 determines whether an out of synchronization index such as that mentioned above exceeds the maximum allowable out of synchronization value (labeled "Exceed max AV sync tolerance" in FIG. 6). When it is detected that the out of synchronization index exceeds the maximum allowable out of synchronization value, Step 340 is entered; otherwise, Step 338 is entered.

In Step 338, the processing circuit 110 determines whether a scene change such as that mentioned above exists. When it is detected that the scene change exists (labeled "scene change detected" in FIG. 6), Step 340 is entered; otherwise, Step 332 is re-entered.

In Step 340, the processing circuit 110 determines whether a standstill phenomenon such as that mentioned above exists, and more particularly, determines whether the aforementioned standstill phenomenon will occur after jumping (labeled "Standstill exists after jumping" in FIG. 6). When it is detected that the standstill phenomenon exists, i.e. the user may encounter the aforementioned standstill problem if the jump operation is performed right now, Step 342 is entered to prevent the standstill problem; otherwise, Step 344 is entered.

In Step 342, the processing circuit 110 delays triggering the jump operation of video playback (labeled "Delay-jump" in FIG. 6).

In Step 344, the processing circuit 110 triggers the jump operation of video playback (labeled "Jump-frame" in FIG. 6), in order to jump to a target frame such as that mentioned above (e.g. a key frame).

As disclosed in FIG. 6, Step 336 is arranged between Step 334 and Step 338 within the working flow 330, where the arrangement of Step 336 can prevent Step 340 from being blocked by Step 338 in some situations (e.g., in a situation where no scene change is detected for a long time period). This is for illustrative purposes only, and is not meant to be a limitation of the present invention. According to a variation of this embodiment, Step 336 can be omitted, where the original downward arrowhead starting from Step 334 is redirected toward Step 338. Similar descriptions for this variation are not repeated in detail here.

Figure 7:
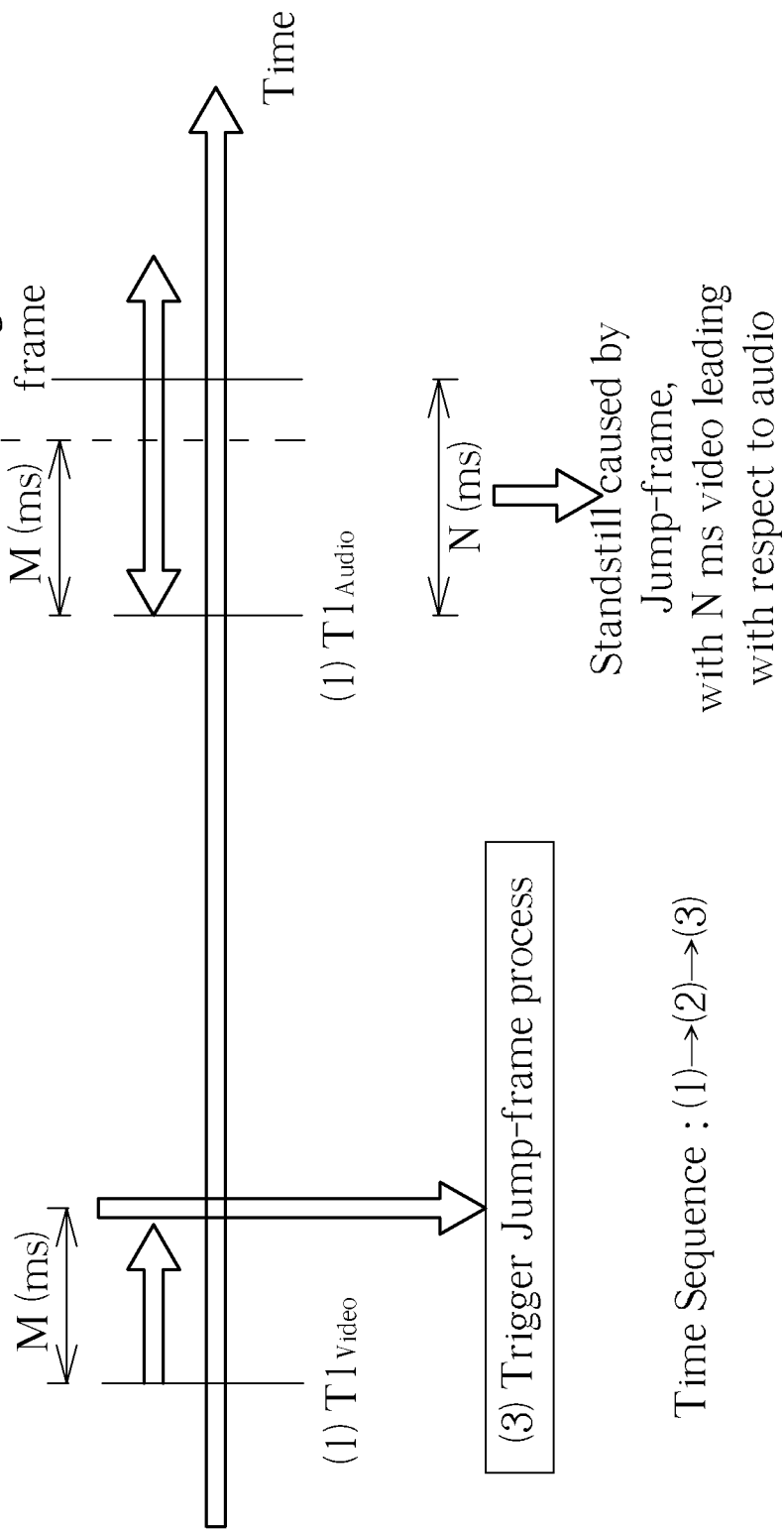
FIG. 7 illustrates an exemplary timing control scheme involved with the method shown in FIG. 2 according to the embodiment shown in FIG. 6.

FIG. 7 illustrates an exemplary timing control scheme involved with the method 200 shown in FIG. 2 according to the embodiment shown in FIG. 6. In the timing control scheme shown in FIG. 7, multiple phases such as the standstill detection phase (1), the standstill elimination phase (2), and the jump-frame triggering phase (3) are illustrated for better comprehension, where the standstill elimination phase (2) comes after the standstill detection phase (1) and the jump-frame triggering phase (3) comes after the standstill elimination phase (2) (labeled "Time Sequence: (1)→(2)→(3)" in FIG. 7).

In the standstill detection phase (1), the processing circuit 110 detects this standstill phenomenon in a situation such as that shown in FIG. 5, and therefore, predicts that the standstill problem would probably occur due to this standstill phenomenon and determines that performing the aforementioned standstill elimination to prevent the standstill problem is required. The respective values of the time current_video_time and the time current_audio_time (which are disclosed in the embodiment shown in FIG. 5) at the moment when this standstill phenomenon is just detected can be re-written to be notations $T1_{Video}$ and $T1_{Audio}$ corresponding to the standstill detection phase (1), respectively.

In the standstill elimination phase (2), the processing circuit 110 performs the aforementioned standstill elimination to prevent the standstill problem. More particularly, under control of the processing circuit 110, the apparatus 100 continues video decoding, in order to eliminate the aforementioned standstill phenomenon that would probably cause the standstill problem mentioned above if the jump operation is performed right now (labeled "Continue video decoding to eliminate possible standstill due to jump" in FIG. 7). The processing circuit 110 may determine the timing $T2_{Audio}$ for triggering the jump operation as follows:

$$T2_{Audio}=T1_{Audio}+M;$$

where the notation M represents the delay amount of delaying triggering the jump operation in Step 342.

In the jump-frame triggering phase (3), the processing circuit 110 triggers the jump operation (labeled "Trigger Jump-frame process" in FIG. 7) since triggering the jump operation has been delayed for the delay amount M.

Figure 8:
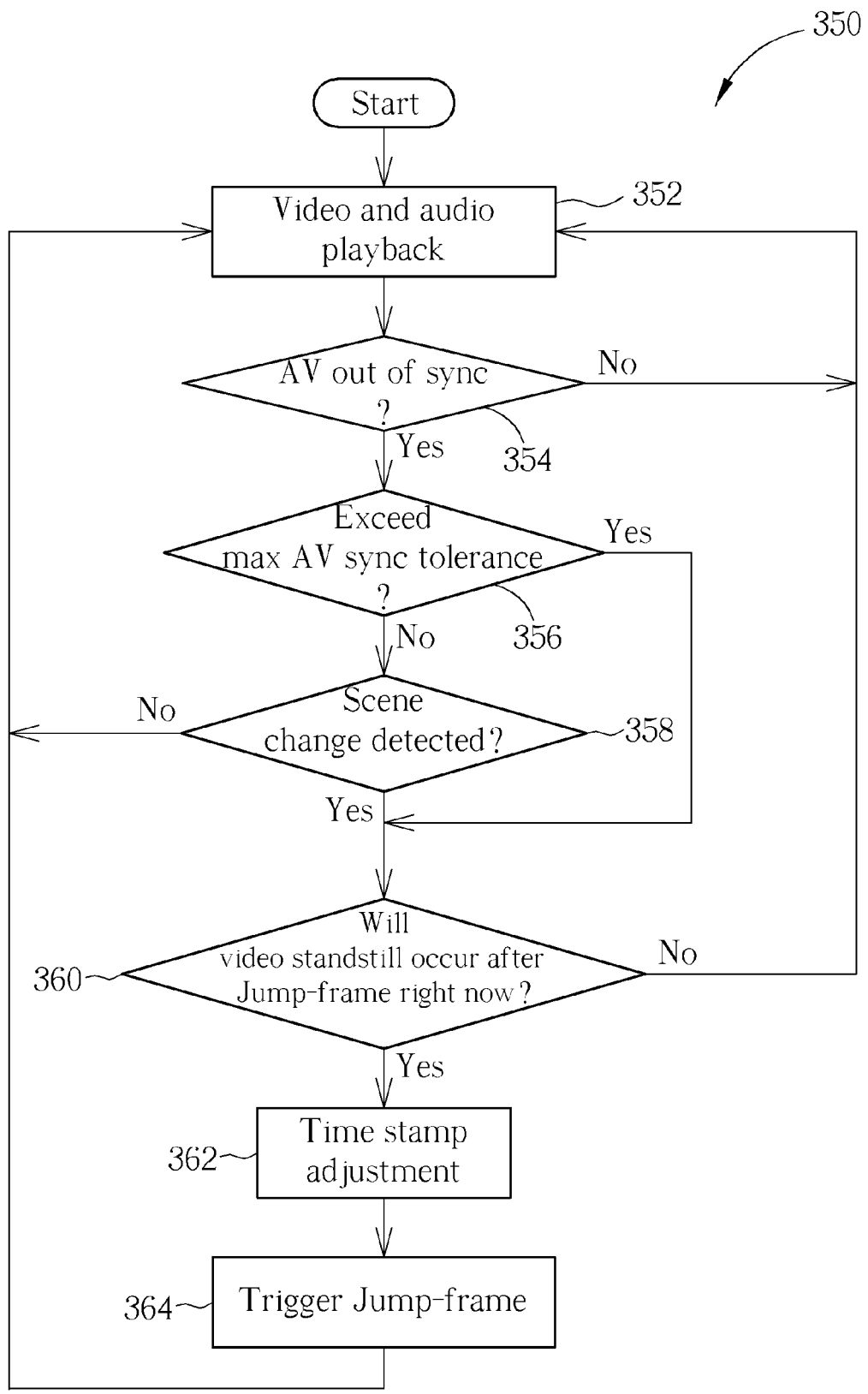
FIG. 8 illustrates a working flow involved with the method shown in FIG. 2 according to another embodiment of the present invention.

FIG. 8 illustrates a working flow 350 involved with the method 200 shown in FIG. 2 according to another embodiment of the present invention.

In Step 352, the processing circuit 110 performs video and audio playback. Typically, the processing circuit 110 performs video playback and audio playback at the same time.

In Step 354, the processing circuit 110 determines whether the aforementioned out of synchronization status regarding audio playback and video playback (labeled "AV out of sync" in FIG. 8) occurs. When it is detected that the out of synchronization status occurs, Step 356 is entered; otherwise, Step 352 is re-entered.

In Step 356, the processing circuit 110 determines whether an out of synchronization index such as that mentioned above exceeds the maximum allowable out of synchronization value (labeled "Exceed max AV sync tolerance" in FIG. 8). When it is detected that the out of synchronization index exceeds the maximum allowable out of synchronization value, Step 360 is entered; otherwise, Step 358 is entered.

In Step 358, the processing circuit 110 determines whether a scene change such as that mentioned above exists. When it is detected that the scene change exists (labeled "scene change detected" in FIG. 8), Step 360 is entered; otherwise, Step 352 is re-entered.

In Step 360, the processing circuit 110 determines whether a standstill phenomenon such as that mentioned above exists, and more particularly, determines whether the aforementioned standstill problem will occur after triggering the jump frame operation right now (labeled "Will video standstill occur after Jump-frame right now?" in FIG. 8). When it is detected that the standstill phenomenon exists, i.e. the user may encounter the aforementioned standstill problem if the jump operation is performed right now, Step 362 is entered; otherwise, Step 352 is re-entered.

In Step 362, the processing circuit 110 performs time stamp adjustment by altering the aforementioned at least one time stamp of decoded audio and video data to be played back, in order to play back video and audio fluently. For example, the processing circuit 110 can alter some time stamps of decoded video data to be played back, so that the timing of video playback can be adjusted to eliminate the standstill phenomenon due to the AN synchronization. In another example, the processing circuit 110 can alter some time stamps of decoded audio data to be played back, so that the timing of audio playback can be adjusted to eliminate the standstill phenomenon due to the synchronization of video and audio playback.

In Step 364, the processing circuit 110 triggers the jump operation (labeled "Trigger Jump-frame" in FIG. 8).

As disclosed in FIG. 8, Step 356 is arranged between Step 354 and Step 358 within the working flow 350, where the arrangement of Step 356 can prevent Step 360 from being blocked by Step 358 in some situations (e.g., in a situation where no scene change is detected for a long time period). This is for illustrative purposes only, and is not meant to be a limitation of the present invention. According to a variation of this embodiment, Step 356 can be omitted, where the original downward arrowhead starting from Step 354 is redirected toward Step 358. Similar descriptions for this variation are not repeated in detail here.

Figure 9:
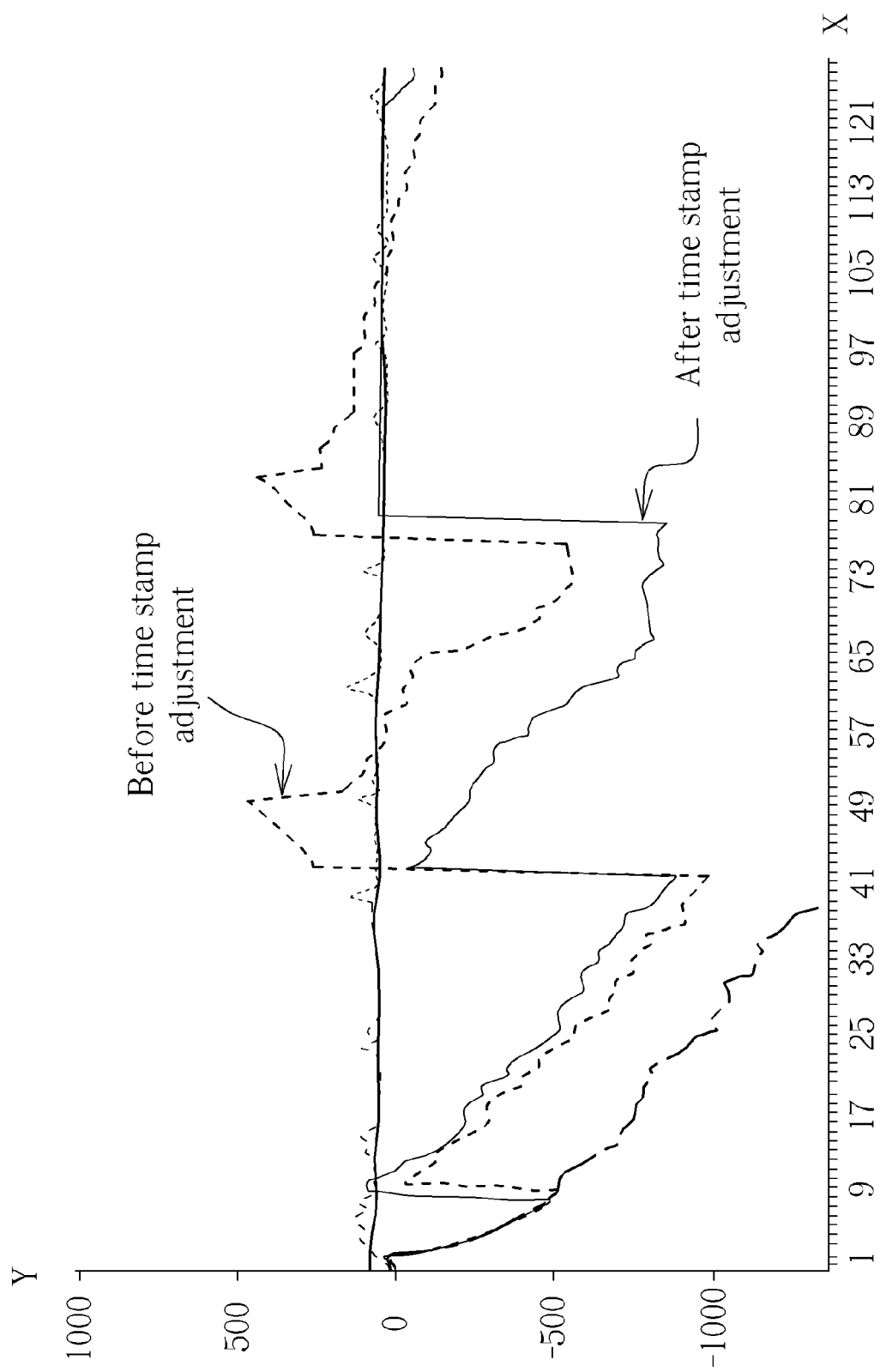
FIG. 9 illustrates some implementation details involved with the method shown in FIG. 2 according to the embodiment shown in FIG. 8.

FIG. 9 illustrates some implementation details involved with the method 200 shown in FIG. 2 according to the embodiment shown in FIG. 8. The X axis represents the audio time, and the Y axis represents the difference ($T_{Video}-T_{Audio}$) between the video time $T_{Video}$ of the time stamp of the frame being played back and the audio time $T_{Audio}$ of the time stamp of the audio content being played back.

According to this embodiment, the curve of the difference ($T_{Video}-T_{Audio}$) for the case without the time stamp adjustment mentioned in Step 362 (i.e. the curve labeled "Before time stamp adjustment" in FIG. 9) abruptly rises multiple times, where the abrupt rising edges above zero of the Y axis in FIG. 9 can be taken as examples of the aforementioned standstill phenomenon. Please note that these abrupt rising edges approximately reach 500, respectively, which means the standstill problem corresponding to the abrupt rising edges may be unacceptable to the user since the top of each of these abrupt rising edges is considered to be too high (above zero). In addition, the curve of the difference ($T_{Video}-T_{Audio}$) for the case with the time stamp adjustment mentioned in Step 362 (i.e. the curve labeled "After time stamp adjustment" in FIG. 9) does not have any abrupt rising edge whose top is high above zero, which means the standstill phenomenon is eliminated by the time stamp adjustment mentioned in Step 362.

Figure 10:
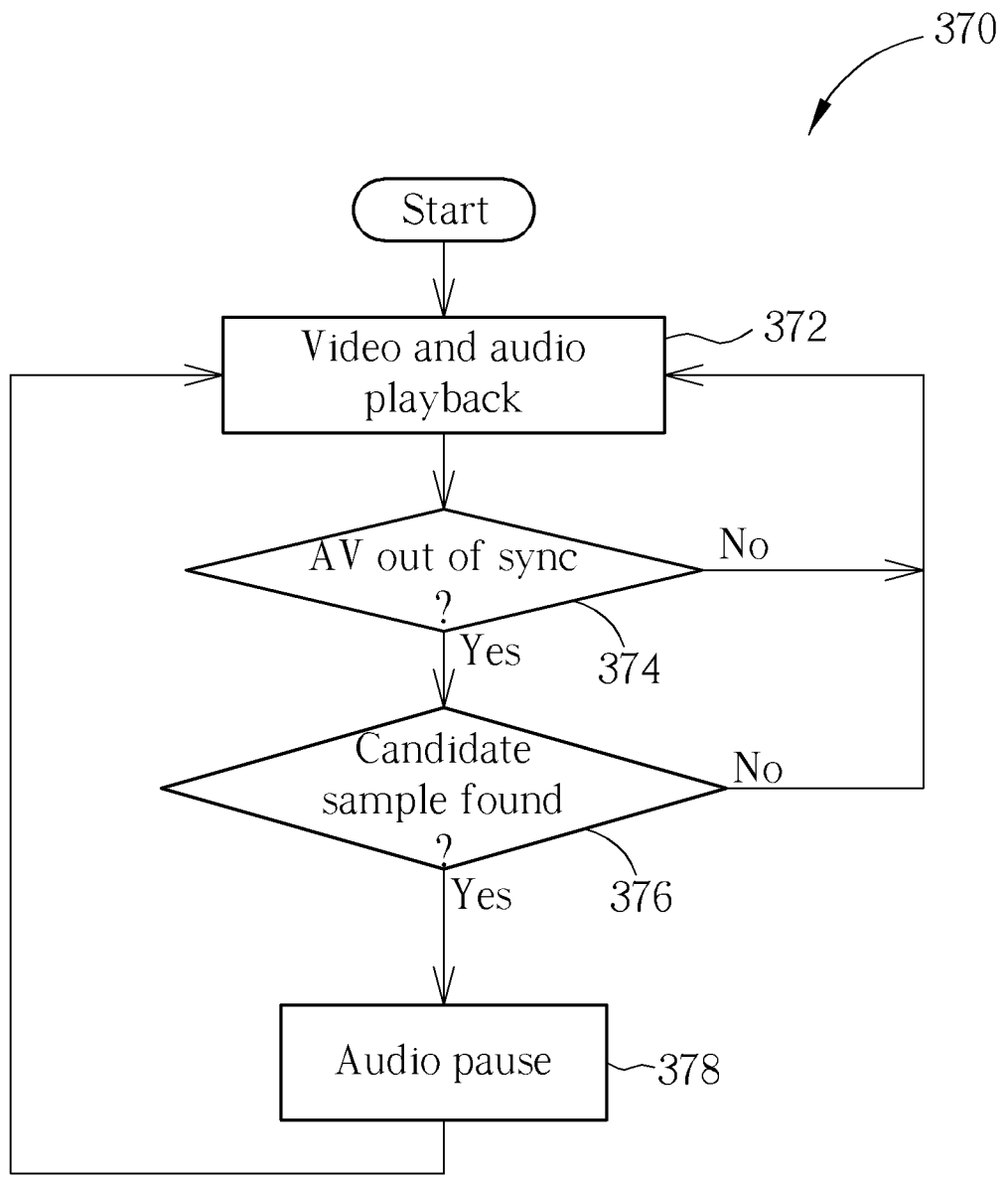
FIG. 10 illustrates a working flow involved with the method shown in FIG. 2 according to another embodiment of the present invention.

FIG. 10 illustrates a working flow 370 involved with the method 200 shown in FIG. 2 according to another embodiment of the present invention.

In Step 372, the processing circuit 110 performs video and audio playback. Typically, the processing circuit 110 performs video playback and audio playback at the same time.

In Step 374, the processing circuit 110 determines whether the aforementioned out of synchronization status regarding audio playback and video playback (labeled "AV out of sync" in FIG. 10) occurs. When it is detected that the out of synchronization status occurs, Step 376 is entered; otherwise, Step 372 is re-entered.

In Step 376, the processing circuit 110 determines whether one or more candidate audio samples exist, and more particularly, determines whether one or more candidate audio samples are found (labeled "Candidate sample found" in FIG. 10). When it is detected that one or more candidate audio samples are found, Step 378 is entered; otherwise, Step 372 is re-entered.

In Step 378, the processing circuit 110 performs an audio pause operation such as the temporary audio pause operation mentioned above, in order to control timing of video playback and audio playback to be synchronized.

Figure 11:
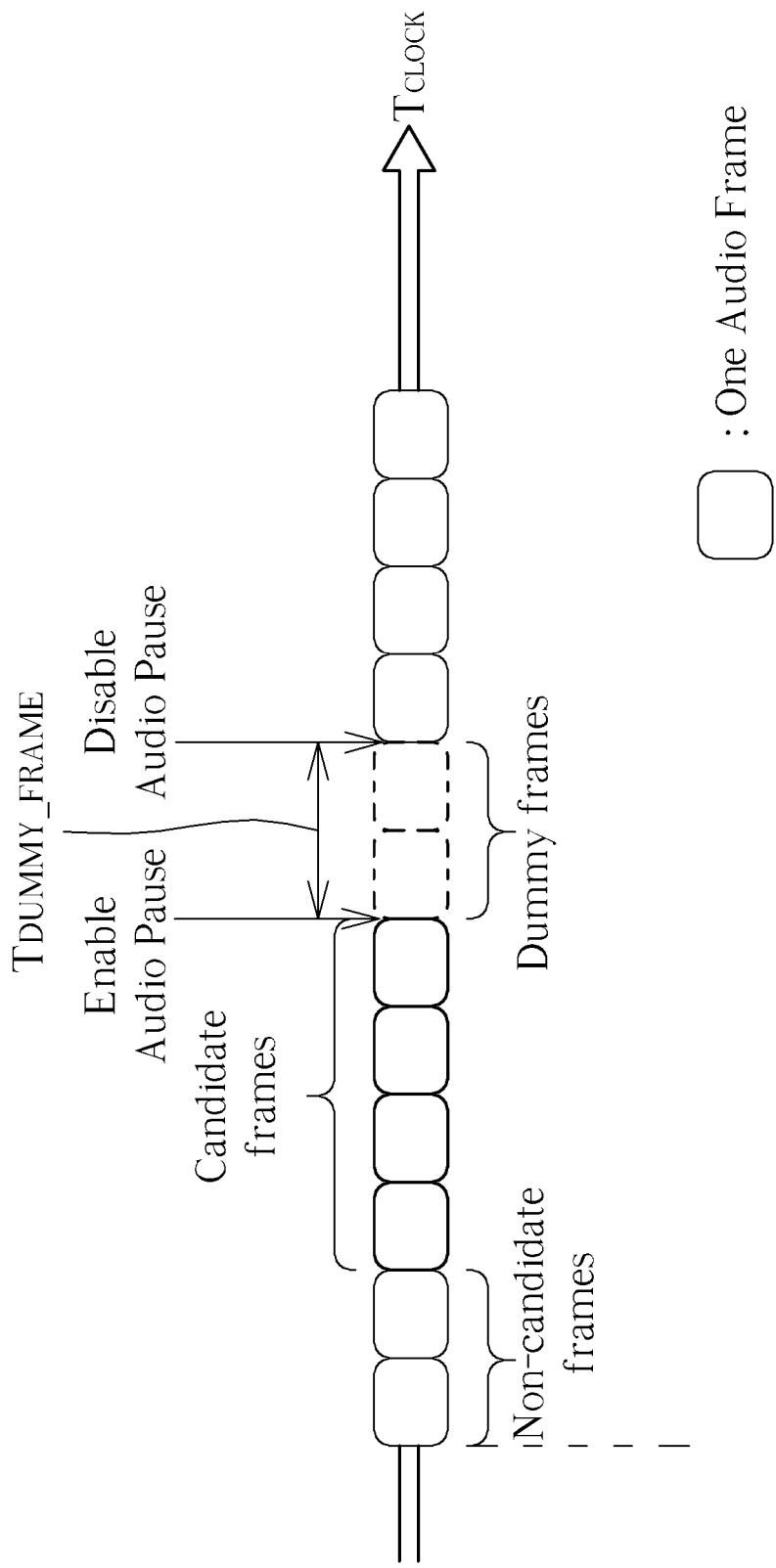
FIG. 11 illustrates an exemplary timing control scheme involved with the method shown in FIG. 2 according to the embodiment shown in FIG. 10.

FIG. 11 illustrates an exemplary timing control scheme involved with the method 200 shown in FIG. 2 according to the embodiment shown in FIG. 10. As shown in FIG. 11, there are some candidate frames such as some quasi-silent frames (i.e. some frames whose audio magnitude is less than the predetermined threshold mentioned in the embodiments) and/or some silent frames. In addition, there are some non-candidate frames in FIG. 11, such as some frames that are neither quasi-silent frames nor silent frames. Additionally, the audio frames under consideration starts from a time point when an audio pause flag for triggering the audio pause operation mentioned in Step 378 is asserted (labeled "Enable Audio Pause" in FIG. 11) and ends at a time point when the audio pause flag is de-asserted (labeled "Disable Audio Pause" in FIG. 11).

According to this embodiment, the processing circuit 110 performs the audio pause operation by inserting some dummy frames, in order to obtain extra time for unfinished and lagged decoding (more particularly, unfinished and lagged video decoding). As a result of the audio pause operation mentioned in Step 378, both of the audio time and the video time are shifted, and can be considered to be at a shifted time ($T_{CLOCK}-T_{DUMMY\_FRAME}$), where the notations $T_{CLOCK}$ and $T_{DUMMY\_FRAME}$ represent the clock time and the overall time of the inserted some dummy frames, respectively. As the dummy frames are next to the candidate frames such as the quasi-silent frames and/or the silent frames in this embodiment, there will be no impact on the user experience since audio is paused insensibly.

Figure 12:
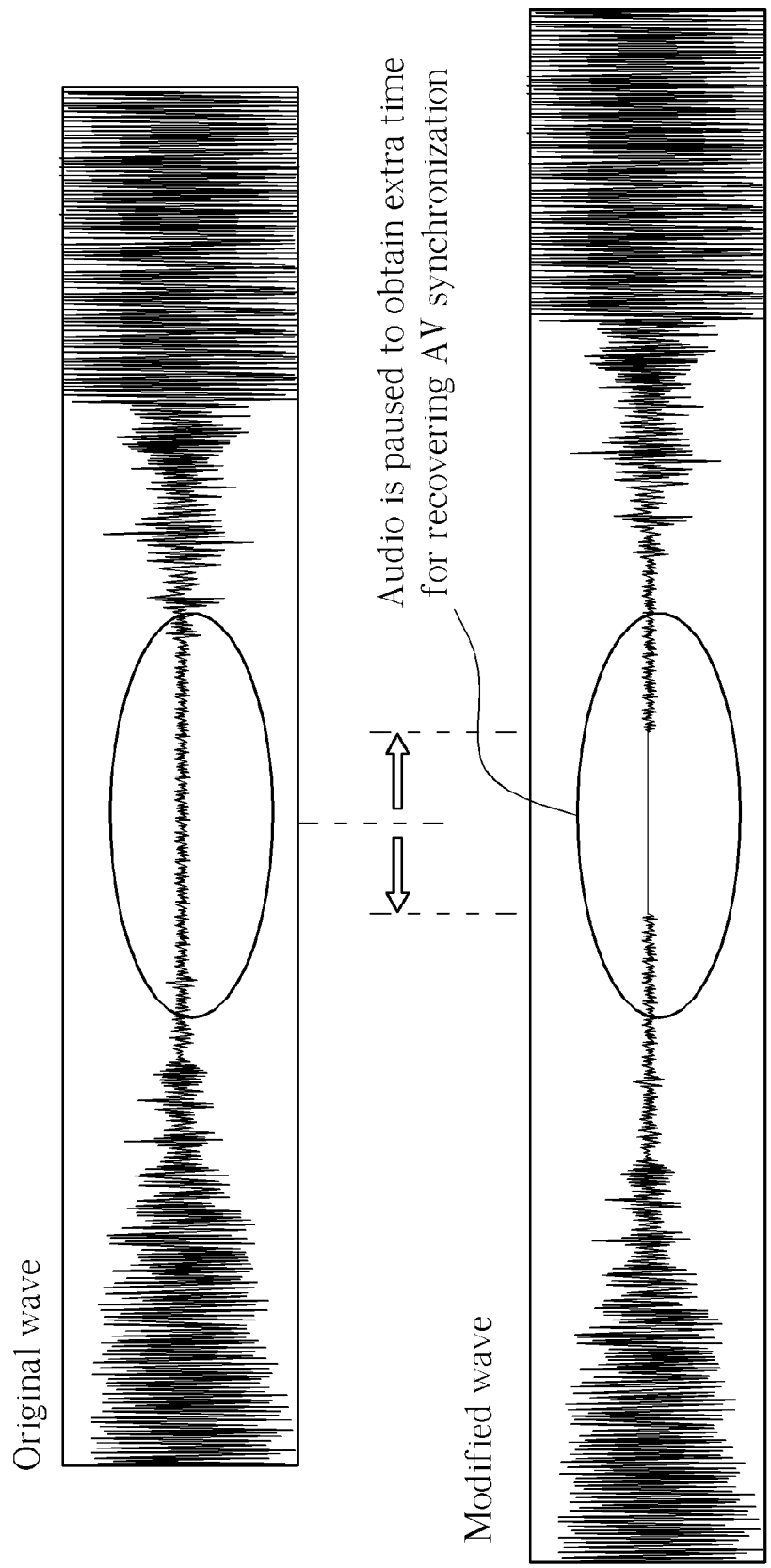
FIG. 12 illustrates some exemplary audio waves involved with the method shown in FIG. 2 according to the embodiment shown in FIG. 11.

FIG. 12 illustrates some exemplary audio waves involved with the method 200 shown in FIG. 2 according to the embodiment shown in FIG. 11. As a result of inserting the dummy frames, a flat curve is inserted between the first half and the second half of the original wave shown in FIG. 12 to generate the modified wave. Thus, the audio (or the audio playback) is paused, and the processing circuit 110 can obtain extra time for recovering the synchronization status regarding audio playback and video playback (labeled "AV synchronization" in FIG. 12).

It is an advantage of the present invention that, as a result of performing the timing control of the jump operation, the probability that the user is sensible of the jump operation may reach zero. In addition, the present invention method and apparatus allow the user to enjoy viewing the A/V clip or the A/V program without encountering any related art problem, where no side effect will be introduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing fluent playback control, the method being applied to an electronic device, the method comprising the steps of:
    determining whether an out of synchronization status regarding audio playback and video playback occurs; and
    when it is detected that the out of synchronization status occurs, controlling jump timing of video playback according to at least one of scene change detection and standstill detection, comprising:
        performing the scene change detection to determine whether a scene change exists;
        when it is detected that the scene change exists, triggering a jump operation of video playback; and
        performing the standstill detection to determine whether a standstill phenomenon will occur if the jump operation of video playback is performed, in order to determine whether to delay triggering the jump operation of video playback.

2. The method of claim 1, wherein the step of determining whether the out of synchronization status regarding audio playback and video playback occurs further comprises:
    determining whether the out of synchronization status occurs by comparing time stamps of decoded audio and video data to be played back with a time reference, respectively.

3. The method of claim 1, wherein the step of controlling the jump timing of video playback according to at least one of the scene change detection and the standstill detection further comprises:
    when it is detected that the scene change exists, triggering the jump operation of video playback to jump to a key frame.

4. The method of claim 1, wherein the step of controlling the jump timing of video playback according to at least one of the scene change detection and the standstill detection further comprises:
    when it is detected that the standstill phenomenon exists, delaying triggering the jump operation of video playback.

5. The method of claim 1, wherein the step of controlling the jump timing of video playback according to at least one of the scene change detection and the standstill detection further comprises:
    when it is detected that the standstill phenomenon does not exist, triggering the jump operation of video playback.

6. The method of claim 1, wherein the step of controlling the jump timing of video playback according to at least one of the scene change detection and the standstill detection further comprises:
    performing the standstill detection by analyzing time stamps of decoded audio and video data to be played back.

7. The method of claim 1, further comprising:
    altering at least one time stamp of decoded audio and video data to be played back, in order to control timing of video playback and audio playback to be synchronized.

8. The method of claim 1, further comprising:
    detecting whether candidate audio samples which are continuous audio samples having a magnitude less than a predetermined threshold exist; and
    when it is detected that candidate audio samples exist, performing a temporary audio pause operation, in order to control timing of video playback and audio playback to be synchronized.

9. An apparatus for performing fluent playback control, the apparatus comprising at least one portion of an electronic device, the apparatus comprising:
    a clock arranged to provide a time reference; and
    a processing circuit arranged to control operations of the electronic device and determine whether an out of synchronization status regarding audio playback and video playback occurs, wherein the time reference is utilized for determine whether the out of synchronization status occurs, and when it is detected that the out of synchronization status occurs, the processing circuit controls jump timing of video playback according to at least one of scene change detection and standstill detection;
    wherein the processing circuit performs the scene change detection to determine whether a scene change exists; and
    when it is detected that the scene change exists, the processing circuit triggers a jump operation of video playback; and
    the processing circuit performs the standstill detection to determine whether a standstill phenomenon will occur if the jump operation of video playback is performed, in order to determine whether to delay triggering the jump operation of video playback.

10. The apparatus of claim 9, wherein the processing circuit determines whether the out of synchronization status occurs by comparing time stamps of decoded audio and video data to be played back with the time reference, respectively.

11. The apparatus of claim 9, wherein when it is detected that the scene change exists, the processing circuit triggers the jump operation of video playback to jump to a key frame.

12. The apparatus of claim 9, wherein when it is detected that the standstill phenomenon exists, the processing circuit delays triggering the jump operation of video playback.

13. The apparatus of claim 9, wherein when it is detected that the standstill phenomenon does not exist, the processing circuit triggers the jump operation of video playback.

14. The apparatus of claim 9, wherein the processing circuit performs the standstill detection by analyzing time stamps of decoded audio and video data to be played back.

15. The apparatus of claim 9, wherein the processing circuit alters at least one time stamp of decoded audio and video data to be played back, in order to control timing of video playback and audio playback to be synchronized.

16. The apparatus of claim 9, wherein the processing circuit detects whether candidate audio samples which are continuous audio samples having a magnitude less than a predetermined threshold exist; and
when it is detected that candidate audio samples exist, the processing circuit performs a temporary audio pause operation, in order to control timing of video playback and audio playback to be synchronized.

* * * * *